Nov. 16, 1965 B. PETERSEN 3,218,632
DEVICE FOR CONVERTING AN ANALOGUE DATUM INTO A DIGITAL DATUM
Filed March 20, 1963
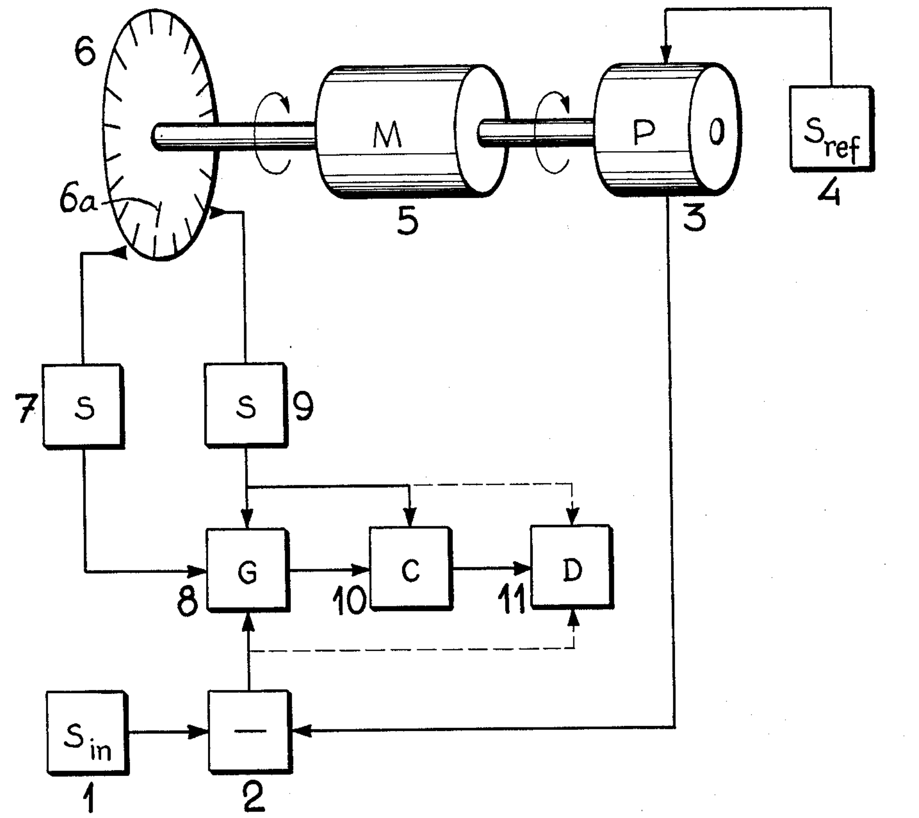

United States Patent Office 3,218,632

Patented Nov. 16, 1965

3,218,632

DEVICE FOR CONVERTING AN ANALOGUE DATUM INTO A DIGITAL DATUM

Berthus Petersen, Delft, Netherlands, assignor to N. V. Instrument Fabriek en-Handel voorheen P. J. Kipp & Zonen, Delft, Netherlands, a Dutch limited liability company Filed Mar. 20, 1963, Ser. No. 266,537
Claims priority, application Netherlands, Apr. 12, 1962, 277,109
5 Claims. (Cl. 340—347)

The present invention relates to a device for converting an analogue datum into a digital datum.

In a known type of such a converter, the analogue input datum is applied to a comparator, to which an analogue feed-back datum is also applied, which is derived from a feed-back means, the output signal of which is dependent upon its position. The feed-back means is coupled with a code disc or a different means, which is provided with one or more series of marks, which co-operate with a scanning means and which thereby give rise to a digital output signal which is dependent upon the position of the code disc. The output signal of the comparator controls the motor driving the code disc and the feed-back means in such a way, that it comes to standstill in a position in which the analogue input datum equals the analogue feed-back datum. Thereby, any value of the analogue input datum gives rise to a different and corresponding value of the digital output datum.

A disadvantage of such a device is, that it is necessary to make use of an elaborate servo system for driving the code disc and the feed-back means, in order that each time the value of the analogue input datum varies, the disc assumes the new position in a sufficiently short time and with high accuracy and negligible overshoot.

For these and other reasons such a device is expensive and complicated.

The function according to which the analogue datum is converted into a digital datum can be changed by replacing the feed-back means by another one with a different characteristic of the analogue feed-back signal as a function of the position. Obviously, this is very expensive, whilst but relatively few different functions can be generated by the usual feed-back means.

Another possibility would be to replace the code disc by another one with a different arrangement of marks. This too, is very expensive and moreover very time-consuming if the new code disc is not already available, since each code disc carries as many code rings as there are orders, in the digital output datum, so that the preparation of a code disc, especially for a non-linear function, is time-consuming and expensive.

Accordingly, it is an object of the invention to provide an analogue-digital converter which is simple and inexpensive and in which the conversion function can without large expenses be modified as may be desired.

A feature of the present invention is that the motor continuously drives the code means and the feed-back means, whilst the scanning means comprises a counter which is reset at the start of the mark cycle and which subsequently counts the marks which are passing by, until it is stopped by the comparator when this observes that the analogue input datum equals the analogue feed-back datum.

These and other features and advantages of the present invention will be more apparent after a perusal of the following specification taken in connection with the accompanying drawing, which shows a block diagram of a converter according to the invention.

In the figure the analogue input datum is derived from a source 1 and applied to a first input of a comparator 2, to a second input of which the analogue feed-back signal is applied, which is derived from a feed-back means 3, which is supplied by reference signal source 4.

The two analogue signals which are applied to the comparator 2 can be of any desired type. If electrical analogue signals are employed, the feed-back means 3 will ordinarily be a potentiometer or a variable capacitor of the type as used in analogue computers.

The feed-back means 3 is continuously driven by a motor 5, which also drives a code disc 6.

The code disc 6 is provided with a single ring of marks, which co-operate with a scanner 7. Depending upon the design of the scanner 7 the marks can be of mechanical, optical, electrical or magnetic nature.

The marks and the scanner 7 are so designed that a pulse is generated by the scanner 7 each time a mark passes by. These pulses are applied to the input of a gate 8, which by an auxiliary scanner 9 is opened, each time the first mark of the mark cycle passes the scanner 7. The auxiliary scanner 9 may, for example, cooperate with and be responsive to a unique or distinctive mark of the single ring of marks, for example, an elongated mark, or cooperate with a separate mark, such as a mark 6*a*, independent of the single ring of marks. The subsequently passed pulses are applied to a counter 10, which can be of any suitable design and which is reset each time the first mark of the series passes by the scanner 7.

As soon as the analogue feed-back signal has become equal to the analogue input signal, the comparator 2 provides a signal which closes the gate 8, whereby no further pulses are applied to the counter 10, which comes to a standstill and can be read-out by means of a display means 11. In many cases it is possible to use a counter with direct read-out, such as a counter which is equipped with rare gas trigger tubes, rare gas counter tubes, cathode ray counter tubes or other counting members with direct read-out. If the display cannot be provided by the counter itself, such as if the count should be printed, the display means 11 forms a separate unit. In that case it may be necessary to put the display means in operation only when the comparator 2 has observed the equality of the analogue feed-back signal and the analogue input signal, whilst the display means 11 is again switched off at the start of a new counting cycle, when the counter 10 is reset by the auxiliary scanner 9.

In this way a new count and consequently a new conversion of the analogue input signal into a digital output signal is effected at each revolution of the coding disc. The function according to which the conversion is effected, depends upon the way in which the markings are arranged on the code disc 6. Since a very simple code disc is employed, a different code disc with a different marks arrangement and consequently a different conversion function can be made without much trouble.

Since the code disc and the feed-back means are continuously driven, no requirements as to high accuracy, small inertia and small overshoot are put upon the drive means. Variations of the revolution speed cause only variations of the sampling rate, which usually are of no consequence. Such variations have no effect at all upon the counting result at each revolution and consequently upon the conversion, however.

What is claimed is:

1. An analog to digital converter comprising, in combination, a movably mounted code-bearing member, the code comprising a series of marks extending from a first mark and a unique mark, a comparator to which an analog input signal is applied, feed-back means supplying an analog feed-back signal to the comparator in accordance with the position of the member, scanner means which generates a digital signal corresponding to the code and a signal corresponding to the unique mark, a gate to which the digital signal is applied, means responsive to the unique mark signal for opening the gate every time said first mark passes the scanner, and a counter which is reset by said means every time said first mark passes the scanner and to which the digital signal passing through the gate is applied, the gate being closed by the comparator when the comparator detects coincidence between the analog signals.

2. An analog to digital converter comprising, in combination, a rotatably mounted code-bearing member, the code including a series of marks extending from a first mark and a unique mark, a comparator to which an analog input signal is applied, feed-back means having a part rotatably mounted and coupled to the member for supplying an analog feed-back signal to the comparator in accordance with the position of the member, the rotatably mounted member and part each being continuously driven, scanner means which generates a series of electrical pulses corresponding in number to the number of the code marks and a signal corresponding to the unique mark, a gate to which the pulses are applied and which is opened in response to the unique mark signal, and a counter to which pulses passed by the gate are applied and which is reset at the start of each scan, the gate being closed by the comparator when the comparator detects coincidence between the analog signals, whereby at said coincidence the count in the counter is a digital indication of said analog input signal.

3. An analog to digital converter according to claim 2 wherein the rotatably mounted member and the rotatably mounted feed-back part are driven together as one by a single motor.

4. An analog to digital converter comprising, in combination, a continuously moving code-bearing member, means driven synchronously with said member for generating an analog signal corresponding to the code on said member, a scanner cooperating with said code-bearing member for generating a digital signal according to the code on said member, a counter, switching means responsive to said member reaching a predetermined point for resetting said counter and connecting it to said scanner, and a comparator responsive to equality of said analog signal and an input signal for disconnecting the counter from the scanner.

5. An analog to digital converter comprising, in combination, a movably mounted code bearing member, the code comprising a series of marks in fixed relation to a unique mark, a scanner adapted to read the series of marks, a counter, a switching circuit connecting the scanner to the counter, means responsive to the passage of the unique mark past a reference point connected to the switching circuit and counter for resetting the counter and connecting the counter to the scanner, an analog signal generator driven synchronously with the code-bearing member and adapted to generate an analog signal corresponding to said series of marks, and a comparator responsive to equality between an input analog signal and said analog signal operatively connected to said switching circuit to disconnect the counter at the instant of equality of said analog signals.

References Cited by the Examiner

UNITED STATES PATENTS

| | | | |
|---|---|---|---|
| 2,775,755 | 12/1956 | Sink | 340—347 |
| 2,877,398 | 3/1959 | Gimpel et al. | 340—347 |

MALCOLM A. MORRISON, *Primary Examiner.*